United States Patent
Yamaguchi

(10) Patent No.: US 8,604,410 B2
(45) Date of Patent: Dec. 10, 2013

(54) PHASE PLATE HAVING FINE PERIODIC STRUCTURE SMALLER THAN VISIBLE LIGHT WAVELENGTH AND PROJECTION IMAGE DISPLAY APPARATUS

(75) Inventor: Yutaka Yamaguchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 270 days.

(21) Appl. No.: 13/227,562

(22) Filed: Sep. 8, 2011

(65) Prior Publication Data
US 2012/0062847 A1    Mar. 15, 2012

(30) Foreign Application Priority Data
Sep. 15, 2010    (JP) .................. 2010-206369

(51) Int. Cl.
*H01J 3/14*    (2006.01)

(52) U.S. Cl.
USPC ............................................. 250/216; 353/97

(58) Field of Classification Search
USPC ......... 250/216, 208.1, 237 G, 237 R; 353/20, 353/73, 75, 85, 97, 119; 349/119; 362/259, 362/551, 607
See application file for complete search history.

(56) References Cited

U.S. PATENT DOCUMENTS 7,199,849 B2 *   4/2007   Iwai et al. ..................... 349/119

FOREIGN PATENT DOCUMENTS

JP    2004163450 A    6/2004

* cited by examiner

*Primary Examiner* — Que T Le
(74) *Attorney, Agent, or Firm* — Rossi, Kimms & McDowell LLP

(57) ABSTRACT

A phase plate includes a transparent substrate and a periodic structure formed on a substrate surface of the transparent substrate. The phase plate is configured to provide light having a predetermined design wavelength that vertically enters the substrate surface with a phase difference from ¼ wavelength to ¾ wavelength. The periodic structure is configured to reduce a volume occupation rate with increasing distance from the transparent substrate, and the periodic structure has a height of at least 200 nm. An angle between a first direction in which a center of a width of a unit periodic structure at a position closest to the substrate surface is connected with a center of a width of a unit periodic structure at a position farthest from the substrate surface and a normal direction of the substrate surface is from 5 degrees to 30 degrees.

11 Claims, 12 Drawing Sheets

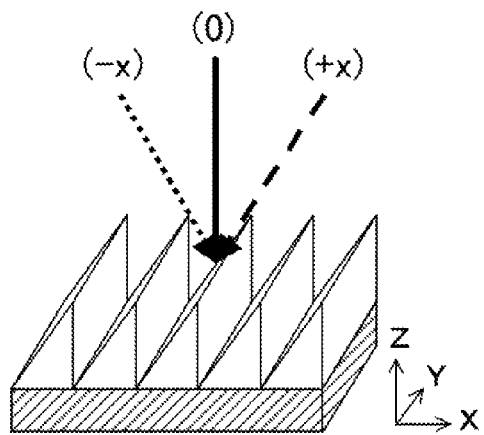
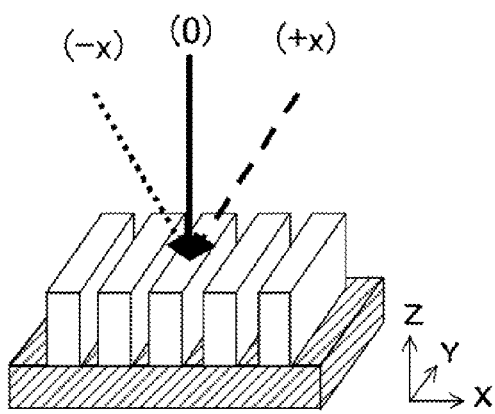
FIG. 4A
FIG. 4B
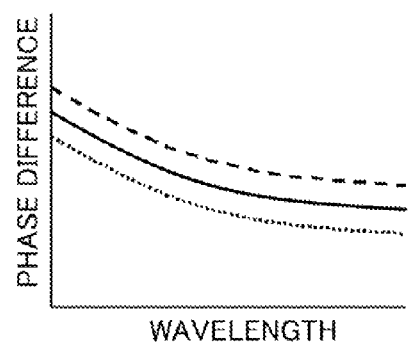
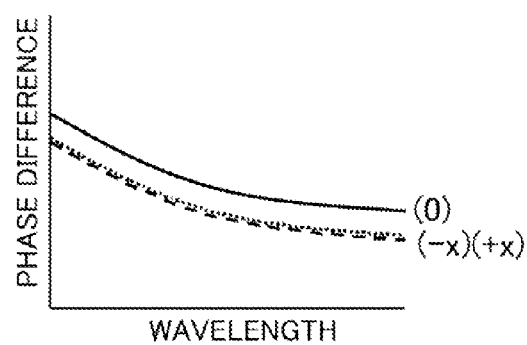
FIG. 5A
FIG. 5B

PHASE PLATE HAVING FINE PERIODIC STRUCTURE SMALLER THAN VISIBLE LIGHT WAVELENGTH AND PROJECTION IMAGE DISPLAY APPARATUS

BACKGROUND OF THE INVENTION

1. Field of the Invention

The present invention relates to a phase plate, and more particularly to a phase plate having a fine periodic structure smaller than a visible light wavelength.

2. Description of the Related Art

Previously, as an optical element that gives a phase difference with respect to a transmission linear polarized light, a phase plate such as a ¼ wavelength plate or ½ wavelength plate has been known. Furthermore, there is a phase plate that has an optical axis in an arbitrary direction inclined from a surface normal direction. Such a phase plate is for example used in a projection image display apparatus to compensate a phase shift generated by a polarization beam splitter, an image display element, or the like, and therefore it has an effect that a light leakage in a projection image is reduced and that the contrast of the projection image is improved.

The phase plate is manufactured by using a fine structure having a period shorter than a wavelength of light to which a phase difference is provided and by controlling its period direction and shape. In this case, in order to obtain a phase plate in which an optical axis is inclined from a surface normal, the period direction itself of the structure may be inclined from a substrate surface. Japanese Patent Laid-Open No. 2004-163450 discloses a phase plate that uses a fine structure having a refractive index anisotropy equivalent to a structure where the optical axis is inclined from the surface normal at an arbitrary angle.

However, it is difficult to manufacture the fine structure as disclosed in Japanese Patent Laid-Open No. 2004-163450. Previously, as a method of fabricating such a fine structure, a method of using a nanoimprint in which a shape is transferred to a material using a mold having the fine periodic structure described above, and an etching process method using a fine mask have been known. However, since the process size is smaller than or equal to a wavelength and the periodic structure is inclined with respect to an element surface, it is difficult to release the mold after the molding in the method of the nanoimprint. Even when the etching is used, the shape needs to be fabricated in an oblique direction with respect to the substrate surface, and therefore it is difficult to uniformly process the oblique grating shape as disclosed in Japanese Patent Laid-Open No. 2004-163450.

SUMMARY OF THE INVENTION

The present invention provides a phase plate that is easily manufactured and that has an optical axis in a direction different from a normal direction of a substrate surface of a transparent substrate.

A phase plate as one aspect of the present invention includes a transparent substrate and a periodic structure that is formed on a substrate surface of the transparent substrate and that has a period of at most a visible light wavelength. The phase plate is configured so as to provide light having a predetermined design wavelength of the visible light wavelength that vertically enters the substrate surface with a phase difference from ¼ wavelength to ¾ wavelength. The periodic structure is configured so as to reduce a volume occupation rate with increasing distance from the transparent substrate in a plane parallel to the substrate surface of the transparent substrate, and the periodic structure has a height of at least 200 nm from the substrate surface. In a cross section that is parallel to both a period direction of the periodic structure and a normal direction of the substrate surface, an angle between a first direction in which a center of a width of a unit periodic structure at a position closest to the substrate surface is connected with a center of a width of a unit periodic structure at a position farthest from the substrate surface and a normal direction of the substrate surface is from 5 degrees to 30 degrees.

A phase plate as another aspect of the present invention includes a transparent substrate and a first periodic structure and a second periodic structure having a period at most a visible light wavelength and formed on a first substrate surface and a second substrate surface of the transparent substrate, respectively. The phase plate is configured so as to provide light having a predetermined design wavelength of the visible light wavelength that vertically enters the first substrate surface with a phase difference from ¼ wavelength to ¾ wavelength. The first periodic structure is configured so as to reduce a volume occupation rate in accordance with increasing distance from the transparent substrate in a plane parallel to the first substrate surface of the transparent substrate, and the first periodic structure has a height of at least 100 nm. The second periodic structure is configured so as to reduce a volume occupation rate in accordance with increasing distance from the transparent substrate in a plane parallel to the second substrate surface of the transparent substrate, and the second periodic structure has a height of at least 100 nm. Period directions of the first periodic structure and the second periodic structure are parallel to each other. In a cross section that is a plane parallel to both the period directions of the first periodic structure and the second periodic structure and normal directions of the first substrate surface and the second substrate surface, an angle between a first direction in which a center of a width of a unit periodic structure at a position closest to the first substrate surface of the first periodic structure is connected with a center of a width of a unit periodic structure at a position farthest from the first substrate surface and a second direction in which a center of a width of a unit periodic structure at a position closest to the second substrate surface of the second periodic structure is connected with a center of a width of a unit periodic structure at a position farthest from the second substrate surface is from 0 degree to 5 degrees. An angle between the first direction and the normal direction of the first substrate surface is from 5 degrees to 30 degrees, and an angle between the second direction and the normal direction of the second substrate surface is from 5 degrees to 30 degrees.

A projection image display apparatus including the phase plate, an image display element, an illumination optical system, and a projection optical system also constitutes another aspect of the present invention.

Further features and aspects of the present invention will become apparent from the following description of exemplary embodiments with reference to the attached drawings.

BRIEF DESCRIPTION OF THE DRAWINGS

FIGS. 4A and 4B are diagrams illustrating polarized lights that enter the one-dimensional periodic structures of FIGS. 1A, 1B, and 2 vertically and obliquely.

FIGS. 5A and 5B are characteristics of transmission phase difference spectra for the lights of FIGS. 4A and 4B.

DESCRIPTION OF THE PREFERRED EMBODIMENTS

Figure 1A:
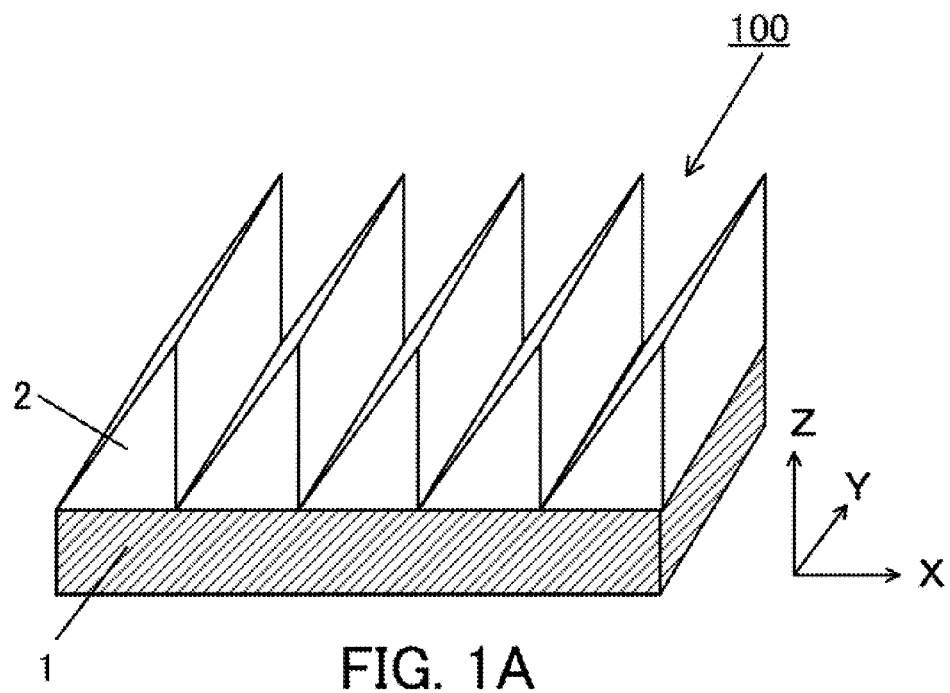
FIGS. 1A and 1B are schematic diagrams of a phase plate in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

Figure 1B:
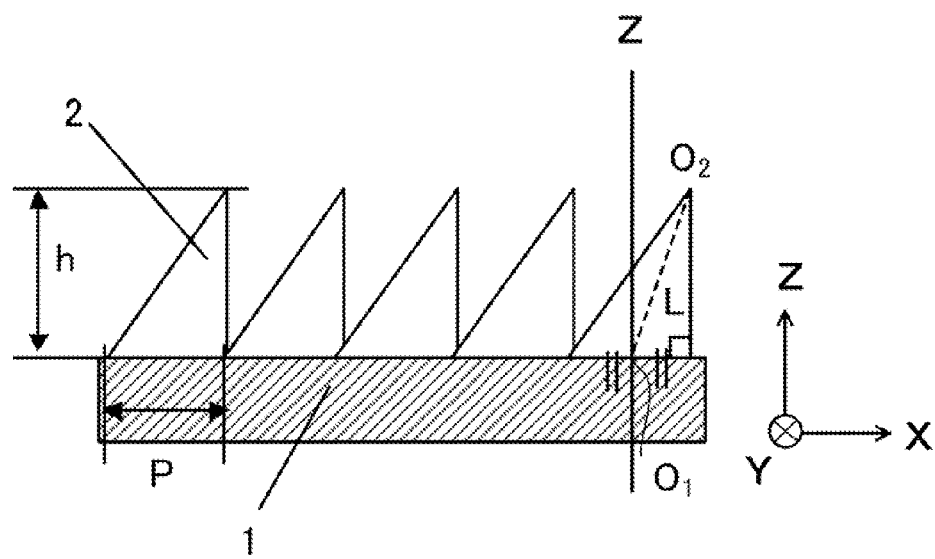

First of all, a phase plate in Embodiment 1 of the present invention will be described. FIG. 1A is a schematic diagram illustrating a configuration of a phase plate 100 in the present embodiment. FIG. 1B is a diagram illustrating a cross-sectional shape in an xz plane of FIG. 1A. The phase plate 100 has a grating period P which is shorter than or equal to a visible light wavelength, and is configured to include a periodic structure 2 (a one-dimensional grating) having a grating height h that is formed on a substrate surface of a transparent substrate 1. The phase plate 100 is also configured to give a phase difference from ¼ to ¾ wavelength to light having a predetermined design wavelength that is a visible light wavelength, which enters the substrate surface vertically. In other words, an optical axis of this phase plate 100 is a direction that is different from a normal direction of the substrate surface of the transparent substrate 1, i.e. the direction of the optical axis is nonparallel to the normal direction of the substrate surface. Furthermore, the optical axis of this phase plate is nonparallel to a substrate surface constituting the periodic structure, and it is preferred that an angle between the optical axis and the substrate surface be from 1 degree to 45 degrees, and more preferably from 3 degrees to 30 degrees.

The periodic structure 2 is configured so that a volume occupation rate is reduced in accordance with increasing distance from the transparent substrate 1 in a plane parallel to the substrate surface of the transparent substrate 1, and for example it has a height greater than or equal to 200 nm from the substrate surface. In a cross section that is a plane parallel to both a periodic direction x of the periodic structure 2 and the normal direction x of the substrate surface (in the xz plane), a direction (a first direction) in which a center $O_1$ of a width of a unit periodic structure of the periodic structure 2 at the position closest to the substrate surface is connected with a center $O_2$ of a width at the position farthest from the substrate surface is defined as L. In this case, an angle between the direction L and the normal direction z of the substrate surface is from 5 degrees to 30 degrees. It is more preferred that this angle is set to be from 5 degrees to 25 degrees. The phase plate 100 of the present embodiment has a triangular shape including a base at a side of the transparent substrate 1 and a vertex at the side closest to the surface, i.e. the position farthest from the transparent substrate 1. Therefore, as for the phase plate 100, the center $O_2$ of the width of the unit periodic structure is a vertex of the triangle at the position farthest from the substrate surface.

The periodic structure 2 is configured to arrange a plurality of unit periodic structures with the grating period P shorter than or equal to the visible light wavelength in the direction x. In the present embodiment, the visible light wavelength is a wavelength in a range from around 400 nm to 700 nm, and the phase plate 100 is used in a range of the visible light wavelength. A phase difference depending on a fine periodic shape is provided to polarized light transmitting through the phase plate 100 due to a form birefringence caused by the fine periodic structure 2 having a period smaller than or equal to the visible light wavelength.

Figure 2:
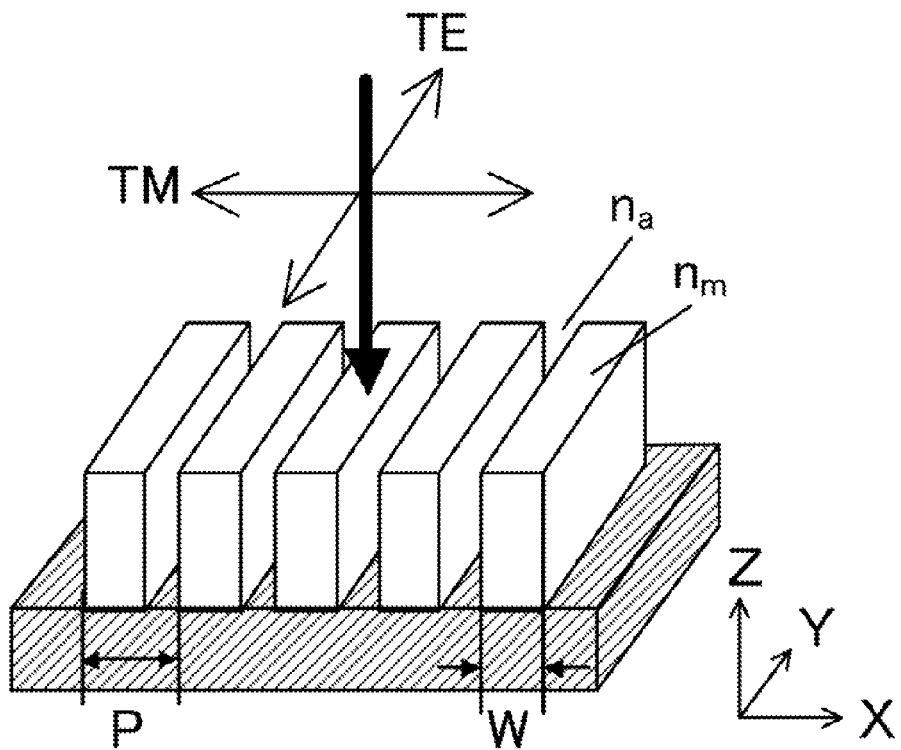
FIG. 2 is a schematic diagram of a phase plate having a common one-dimensional periodic structure.

Next, referring to FIG. 2, the form birefringence and an effective refractive index method will be described. FIG. 2 illustrates two polarized lights (TE polarized light and TM polarized light) that enter a one-dimensional fine rectangular grating structure. When the period of the one-dimensional grating is shorter than or equal to the incident polarized light, a refractive-index anisotropy (the form birefringence) is generated due to the periodic structure and polarized light directions (a TE direction or a TM direction). The effective refractive index method is a method of obtaining an apparent refractive index (the effective refractive index) for the fine periodic structure smaller than or equal to a diffraction limit. In the one-dimensional grating of FIG. 2, the effective refractive indexes n(TE) and n(TM) for polarized light components of the TE polarized light that is orthogonal to the grating period direction and the TM polarized light that is vertical to both the TE polarized light and the incident surface are given by the following Expressions (1) and (2), respectively.

$$n(TE) = \sqrt{n_m^2 \cdot ff + n_a^2(1-ff)} \quad (1)$$

$$1/n(TM) = \sqrt{ff/n_m^2 + (1-ff)/n_a^2} \quad (2)$$

In Expressions (1) and (2), $n_a$ is a refractive index of a medium between the gratings, and $n_m$ is a refractive index of a grating material. Furthermore, ff is a filling factor, which is defined as ff=W/P for the period P of the structure and the width W of the grating.

Figure 3:
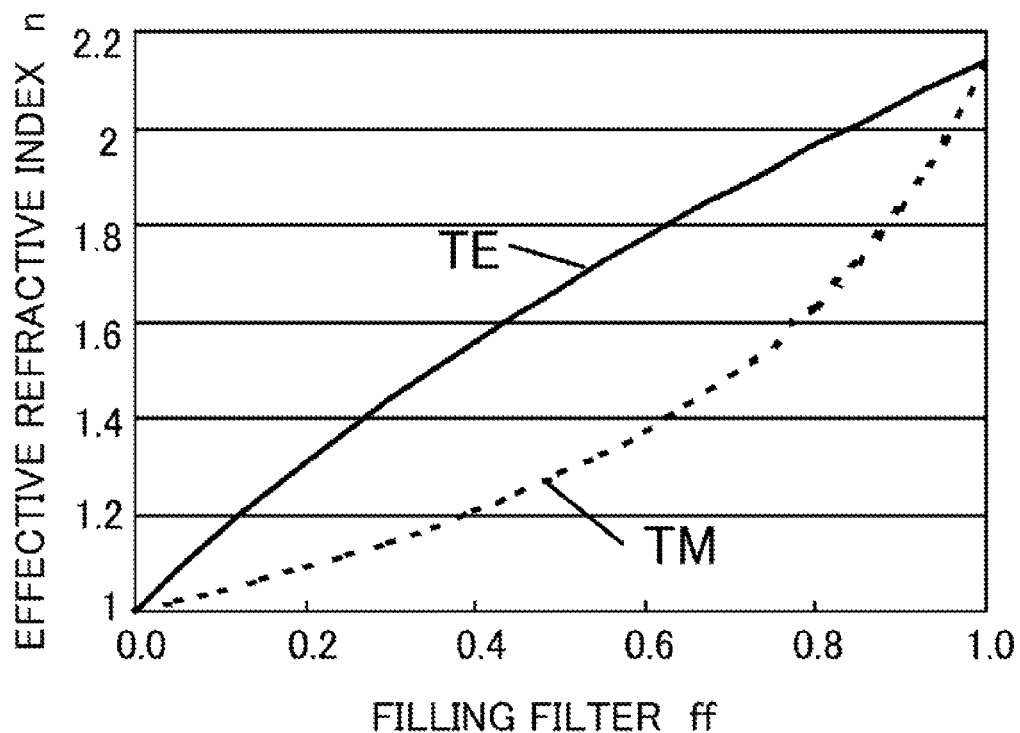
FIG. 3 is a correlation diagram of the one-dimensional periodic structure of FIG. 2 and an effective refractive index for incident polarized light.

FIG. 3 is a result obtained by plotting the effective refractive index n (Expressions (1) and (2)) in which a horizontal axis indicates ff and a vertical axis indicates the effective refractive index n on conditions that $n_a=1.0$ and $n_m=2.3$ are met. As illustrated in FIG. 3, a difference is generated between the effective refractive indexes for the two polarized lights (the TE polarized light and the TM polarized light). Thus, the polarized light that transmits through a fine periodic structure shorter than or equal to the visible light wavelength obtains a phase difference in accordance with the structure or the material. When a fine structure is designed in detail, it is necessary to perform an electromagnetic wave analysis such as a rigorous coupled wave analysis. However, the effective refractive index can be easily and roughly calculated by the above method to obtain rough characteristics. The phase plate 100 having the structure illustrated in FIGS. 1A and 1B is also obtained by overlapping the one-dimensional fine periodic structure of FIG. 2, and the phase plate 100 functions as a phase plate that provides the transmitted polarized light with the phase difference.

Next, a phase difference generated for polarized light which obliquely enters the phase plate in the present embodiment will be described. FIG. 4A is a diagram illustrating vertically-incident polarized light and obliquely-incident polarized lights in the xz plane for the phase plate in the present embodiment. The vertically incident ray is represented by (0), and the obliquely incident rays are represented by (+x) and (−x) in accordance with a direction of an incident angle, respectively. Similarly to FIG. 4A, FIG. 4B illustrates a case of a one-dimensional rectangular grating as a comparative example.

FIGS. 5A and 5B are diagrams illustrating tendencies of transmission phase differences that are generated for three incident polarized lights (the vertically incident ray (0), and the obliquely incident rays (+x) and (−x)) illustrated in FIGS. 4A and 4B respectively. In the rectangular grating shape of FIG. 4B as a comparative example, any difference is generated between the obliquely incident rays (+x) and (−x) as illustrated in FIG. 5B. On the other hand, in the triangular grating shape of the present embodiment, the phase difference for the obliquely incident rays (+x) and (−x) are not equal to each other, and the difference is generated in accordance with an incident direction. This is caused by the asymmetry of the cross-sectional shape in the xz plane, and characteristics of an asymmetric phase differences are generated for the angles of the obliquely incident rays (−x) and (+x) when the tilt direction L of the one-dimensional grating is not parallel to the normal direction (the z direction).

Figures 6A, 6B:
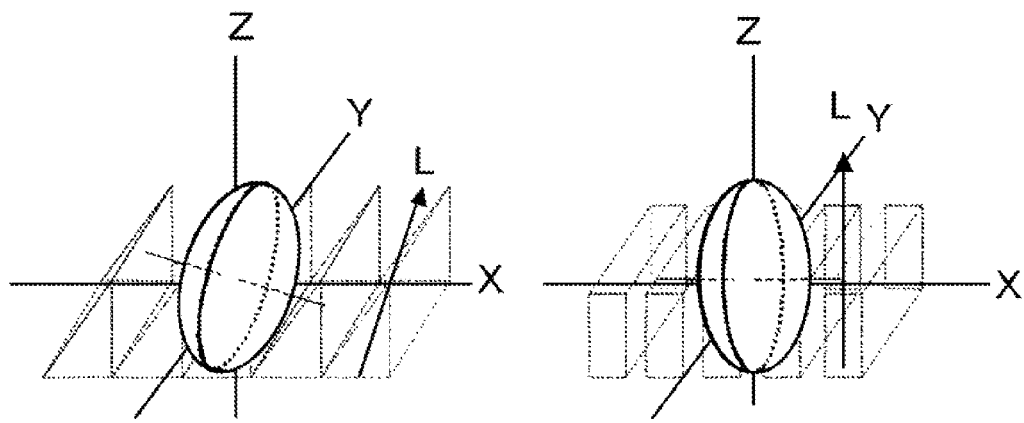
FIGS. 6A and 6B are diagrams illustrating a relationship between the one-dimensional periodic structures of FIGS. 4A and 4B and a uniaxial refractive index ellipsoidal shape.

Commonly, the phase difference generated when the polarized light transmits through the phase plate is determined in accordance with an incident angle and an incident direction of the incident polarized light, and refractive index anisotropy of the phase plate. In order to represent the difference of the refractive index anisotropies of FIGS. 4A and 4B, FIGS. 6A and 6B illustrate both the structures of FIGS. 4A and 4B as refractive index ellipsoids, respectively. The refractive index ellipsoid represents the refractive index anisotropy as a spheroid, and the refractive index anisotropy for each incident ray is represented as a long axis length and a short axis length of the ellipsoid in a cross section of a plane perpendicular to the direction of the ray transmitting through the medium. First of all, as for the rectangular grating illustrated in FIG. 6B, the effective refractive indexes have the relation of n(TE)>n(TM) as illustrated in FIG. 3. Therefore, the effective refractive index for the polarized light oscillating in parallel to the x direction has a value smaller than the effective refractive index for the polarized light parallel to the y direction. When the structural symmetry in the y direction and the z direction is substantially equal to each other, as illustrated in FIG. 6B, it can be treated as a uniaxial refractive index ellipsoid which has a refractive index equal to the polarized lights in the y and z directions and has a relatively smaller refractive index for the polarized light in the x axis direction, and has the optical axis in the x axis direction. In fact, the grating height in the z direction is smaller than the length of the grating in the y direction and the uniaxial approximation is not satisfied in some cases, but it may be treated as a refractive index ellipsoid having a relatively small refractive index for the polarized light parallel to the x axis direction even when the case is applied. In this case, the refractive index anisotropies for the obliquely incident rays (−x) and (+x) illustrated in FIGS. 5A and 5B are equal to each other, and the same phase difference is given to the two obliquely incident rays (−x) and (+x).

As for the case of FIG. 6A, it is treated as an overlap of the one-dimensional rectangular gratings, and it is easy to assume that the refractive index for the polarized light parallel to the x direction has a refractive index smaller than the refractive index for the polarized light parallel to the y direction. However, because the grating side surface is inclined, the refractive index anisotropies for the obliquely incident rays (−x) and (+x) are different from each other and the transmission phase difference is changed. In other words, a direction in which the effective refractive index in the phase plate of the present embodiment (FIG. 4A) is the minimum is not parallel to the x direction and is inclined in the xz plane, and similarly it is assumed that the distribution of the refractive index anisotropy is inclined as illustrated in FIG. 6B.

Figure 7:
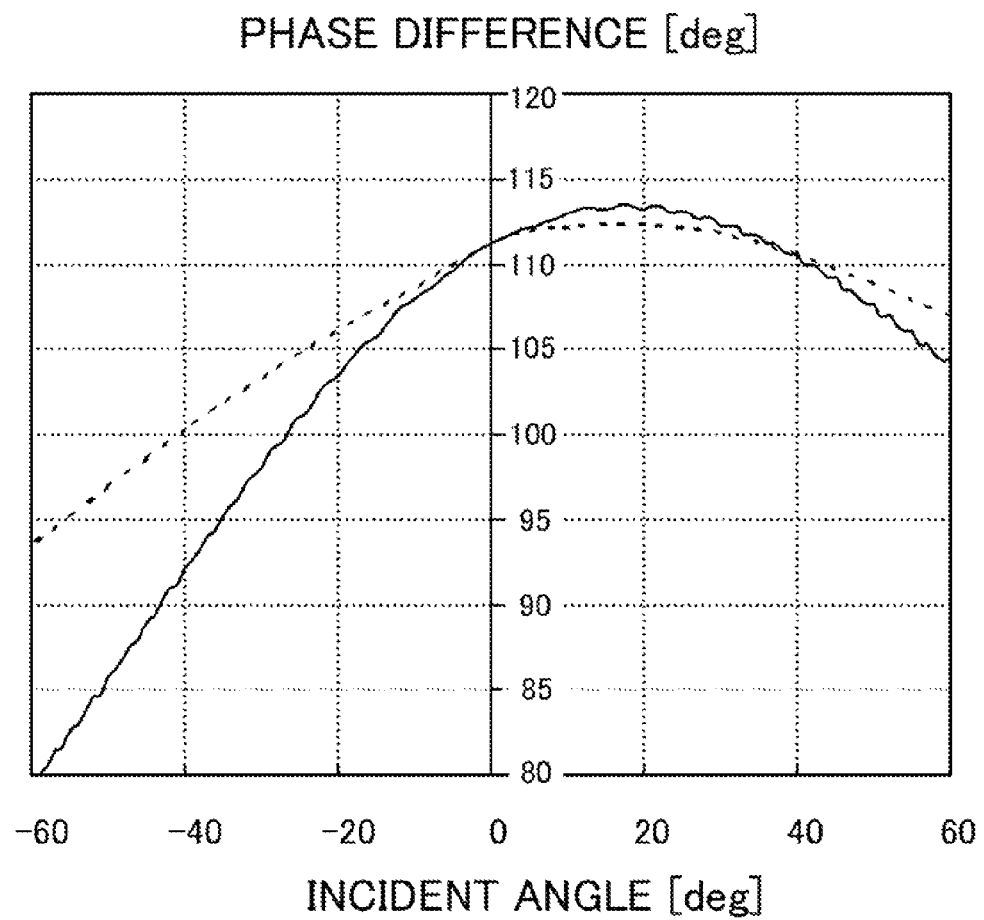
FIG. 7 is characteristics of a phase difference incident angle of the phase plane in Embodiment 1.

FIG. 7 is a diagram obtained by plotting incident angle changes of the phase differences that are generated by the ray transmitting through the phase plate. The incident angle is defined as an angle with respect to the z axis when the xz planes in FIGS. 1A and 1B are incident planes. A solid line in FIG. 7 is, as illustrated in FIG. 6A, obtained by calculating the transmission phase difference on the assumption that the phase plate in which the optical axis of the refractive index ellipsoid is inclined by around 5.7 degrees with respect to the x direction in the xz plane. A dotted line in FIG. 7 illustrates a result obtained by calculating the phase difference of the ray transmitting through the triangular grating shape in which the L direction is inclined by around 5.7 degrees with respect to the z direction using the rigorous coupled wave analysis (RCWA) in the grating shape of FIG. 1B. Both the refractive indexes obtained by averaging the refractive index anisotropies are equal to each other, and the phase differences in the zero-degree incidence set to be the same. Compared with both the cases, peak positions of the incident angle changes of the phase differences are near 18 degrees, which is substantially the same although change amounts of the phase differences with respect to the incident angles are different. Therefore, the direction of the optical axis when the fine periodic shape illustrated in FIG. 4A is approximated by the refractive index ellipsoid is equal to a direction orthogonal to the L direction. In other words, the fine triangular grating periodic structure as illustrated in FIG. 4A functions as a phase plate having the inclined optical axis as illustrated in FIG. 6A.

Thus, the shape as described in the present embodiment is capable of easily manufacturing a phase plate having a fine periodic structure in which the optical axis is inclined with respect to the surface normal although it was previously difficult to manufacture the phase plate. Furthermore, the shape of the phase plate can be easily controlled. In this case, the direction of the anisotropy of the phase plate is controlled by the direction L connecting the center portion of the grating width at the substrate side of the triangular grating with the center portion (the vertex portion) of the grating width at the incident side. Therefore, when the angle of the optical axis is determined, the similar shape of the substantial triangular grating is determined. However, it is necessary to be designed so that any negative influence on the optical characteristics does not occur in the shape determination, for example so that the diffraction caused by the periodic structure is suppressed while a required phase difference is obtained. Therefore, in the phase plate of the present embodiment, in order to obtain desired characteristics, it is preferred that the grating period P, the grating height h, and the refractive index nm of the grating material be set in predetermined ranges.

First of all, as for the grating period P, diffracted light is generated by the grating period structure when the grating period P is greater than the wavelength of the incident light. However, when the diffracted light is generated, it is undesirable as an optical element because the light is dispersed in undesirable directions in addition to the decrease of the zeroth-order transmitted light intensity. Therefore, it is preferred that the grating period P be set to be shorter than the minimum wavelength of the use light, and more preferably the grating period P of the phase plate in the present embodiment is set to be shorter than or equal to 350 nm in order to suppress the diffraction in the visible light wavelength. On the contrary, when the grating period P is small, manufacturing of the phase plate is difficult because of the reduction in size of the shape and also a sufficient phase difference is not easily obtained. Since the shape of the triangular grating is substantially determined by the direction of the anisotropy, the grating height h has to be similarly decreased when the grating period P is small, and as a result a sufficient phase difference is not easily obtained. In the phase plate of the present embodiment, it is preferred that the grating period P is set to be at least 50 nm.

Furthermore, in order to have a sufficient phase difference as a phase plate, it is necessary to have appropriate refractive index and grating height. A necessary and sufficient phase difference can be ensured if the grating height is high, but the grating period P increases when the grating height h is enlarged since the grating shape is determined. However, it is necessary that the grating period P is set to be in a range of the above limit (50 nm to 350 nm). Alternatively, as represented by Expressions (1) and (2) of the effective refractive index, the difference of the refractive index anisotropy |n(TE)−n(TM)| can be widely set if the refractive index $n_m$ of the grating material on conditions that $n_a$ is constant. It is assumed that the phase plate of the present embodiment functions as a phase plate having a phase difference of ¼ wavelength to ¾ wavelength in a range of the visible light wavelength with respect to the vertically incident ray. Therefore, it is preferred that the grating height h be at least 200 nm. When the grating height h is lower than or equal to 200 nm, a sufficient phase difference for the structure of the grating shape cannot be obtained. Similarly, in order to ensure the sufficient refractive index difference, it is preferred that the refractive index $n_m$ of the material constituting the grating be greater than or equal to 1.60. Furthermore, in order to obtain a shape in which the L direction is greatly inclined from the z direction while ensuring the sufficient phase difference, the grating period P needs to be widely set. When the sufficient phase difference is obtained by the simple shape in a range of the diffraction limit, it is preferred that an inclined angle of the L direction with respect to the z direction be set to be from 5 degrees to 30 degrees.

As a method of manufacturing the phase plate having such a fine periodic structure, for example there are a method of a mask etching or a method of imprint lithography, i.e. a transfer molding process using a mold. In the method of the mask etching, after a fine mask structure is formed on a grating material by an interference exposure, a self-assembled film, or the like, a grating material part is selectively etched by an etching gas. Then, the mask is removed to be able to form a fine periodic structure on a substrate. In this method, series of the above processes are performed for a large area to be able to reduce the production cost.

In the method of the imprint lithography, the mold of transferring the fine periodic structure is previously manufactured by the fine fabrication using an electron beam or the mask etching, and the fine periodic structure can be manufactured by transferring the fine structure on the grating material layer using the mold. In the imprint lithography, continuous transferring is performed using the mold having the same shape to be able to manufacture the same shape in a short time. As above, although a method of manufacturing a representative fine periodic structure is indicated, a method of manufacturing the phase plate of the present embodiment is not limited to the above method, and the effect of the present embodiment is not lost even when the phase plate is manufactured by other various kinds of processes.

In order to achieve the phase plate having characteristics in which the optical axis is inclined by the fine periodic structure, as previously disclosed in Japanese Patent Laid-Open No. 2004-163450, it is necessary that a whole of a fine grating have a structure that is inclined from a plate surface, and it was difficult to manufacture this structure using the process as indicated by the above description. On the other hand, the phase plate of the present embodiments can be easily manufactured by a simpler structure, and can also obtain the characteristics nearly equal to the previous phase plate having a fine inclined structure.

Figure 8A:
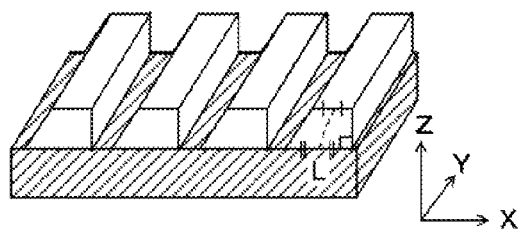
FIGS. 8A to 8D are diagrams of illustrating other examples of the phase plate in Embodiment 1.
Figure 8B:
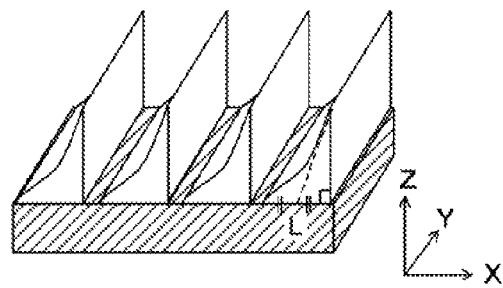
Figure 8C:
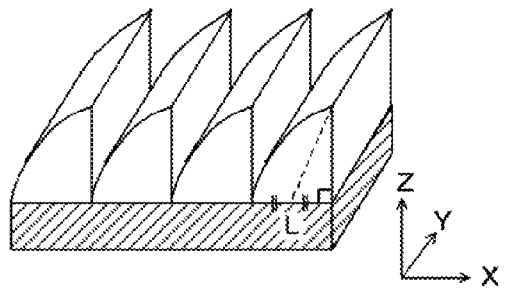
Figure 8D:
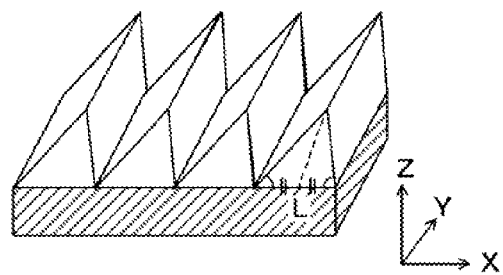
Figure 9A:
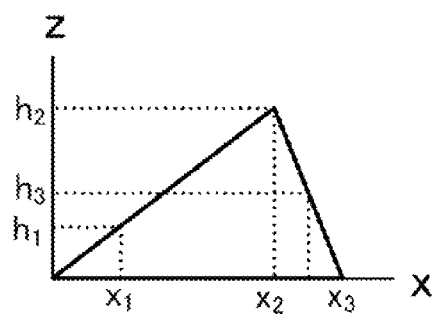
FIGS. 9A and 9B are diagrams of illustrating a cross-sectional shape of the phase plate in Embodiment 1.
Figure 9B:
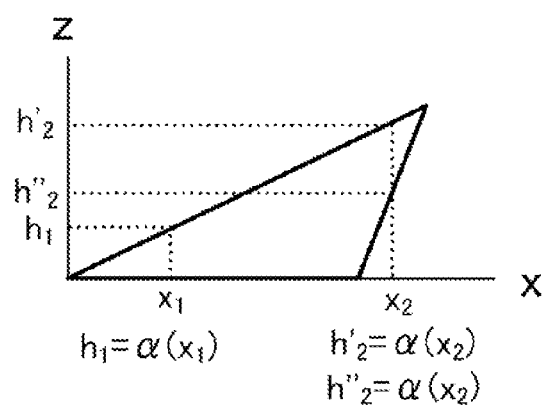

In the present embodiment, as illustrated in FIGS. 1A and 1B, although the case in which a cross section of the grating has a triangular shape is described as an example, the present embodiment is not limited to this. The phase plate of the present embodiment has only to have a shape in which the grating width is gradually narrowed with increasing distance from the substrate side and be formed so that the grating side wall direction is asymmetric with respect to the surface normal. For example, even when the shape illustrated in FIGS. 8A to 8C are adopted, the effect equivalent to the phase plate illustrated in FIG. 8D can be obtained. However, it is preferred that one surface of the grating side wall is formed so as to be substantially parallel to the surface normal direction of the phase plate, two basic angles of the xz cross-sectional shape (the unit periodic structure) of the grating are smaller than or equal to 90 degrees, and one of the basic angles is greater than or equal to 85 degrees. When both the grating side surfaces are out of the above condition and it is significantly inclined from the surface normal, it is not preferable since the asymmetry of the refractive index anisotropy is weakened. As illustrated in FIG. 9A, in the cross-sectional shape in the xz plane, when the grating height h is equal to a (x) (h=a(x)) to obtain a function of an x coordinate, it is preferred that the grating height h be a one-valued function for x. As illustrated in FIG. 9B, the manufacture is rather difficult when the grating height h is not the one-valued function for x and there are two "h" for one "x". In other words, in a cross section parallel to both the periodic direction of the periodic structure and the normal of the substrate surface (a cross section of FIG. 1B, FIG. 9A, or FIG. 9B), the unit periodic structure constituting the periodic structure (the unit periodic structure, or one structure) satisfies the following conditions. In the cross section described above, all internal angles of the triangle of the unit periodic structure are smaller than or equal to 90 degrees. In other words, the normal directed from the vertex far from the substrate surface to the substrate surface of the three vertexes of the triangle of this unit periodic structure intersects with the substrate surface at a position between the other two vertexes (including the same position). In other words, a normal vector extending to the outside of the triangle for the two surfaces (excluding the substrate surface) of the triangle of the unit periodic structure extends to a direction getting away from the substrate surface. The satisfactions of these conditions enable the easy manufacturing of the structure.

The detailed values of the phase plate in the present embodiment are indicated in Table 1.

TABLE 1

|  | PERIODIC STRUCTURE 2 |
|---|---|
| PERIOD P | 100 nm |
| GRATING HEIGHT h | 500 nm |
| MATERIAL | TiO2 (n = 2.4@550 nm) |
| ANGLE BETWEEN L AND z | 5.7 deg |
| PHASE DIFFERENCE (550 nm) | 198 nm (0.36λ) |

Figure 10:
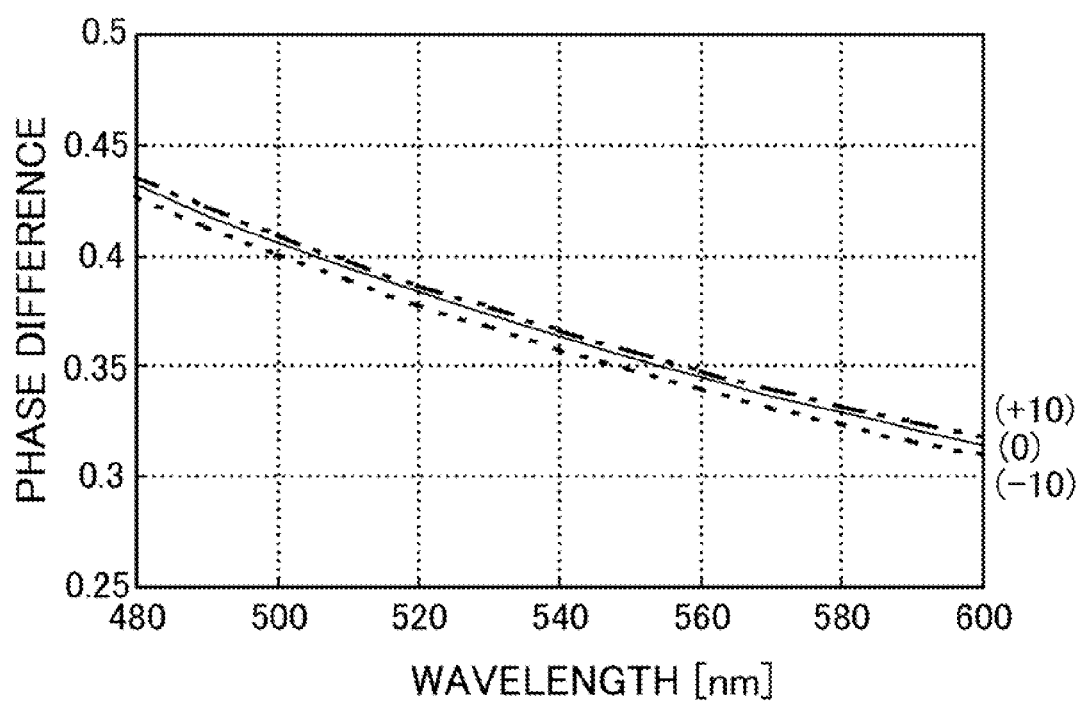
FIG. 10 is characteristics of a phase difference of the phase plate in Embodiment 1.

As indicated in Table 1, the phase plate is configured by a $TiO_2$ grating (the refractive index n=2.4 (the design wavelength: 550 nm)) having the grating period P=100 nm and the grating height h=500 nm. The cross section of the grating in the xz plane has the triangular shape as illustrated in FIG. 1B, and one of the grating side surfaces is disposed so as to be parallel to the yz plane. FIG. 10 illustrates characteristics of spectroscopic phase differences in the phase plate of the present embodiment. The differences of types of lines indicate the differences of the phase difference in a +10 degree incidence, a vertical incidence, and a −10 degree incidence, respectively. The phase plate of the present embodiment functions as a phase plate which provides a phase difference of around 0.35λ for the light having the design wavelength of 550 nm. The design wavelength is the visible light wavelength, and it indicates a certain wavelength which is used by the phase plate in a main wavelength band, and it is commonly selected from near the center of the wavelength band. The phase plate in the present embodiment has characteristics equivalent to the structure in which the optical axis is inclined from the in-plane direction by around 5.7 degrees.

Embodiment 2

Figure 11A:
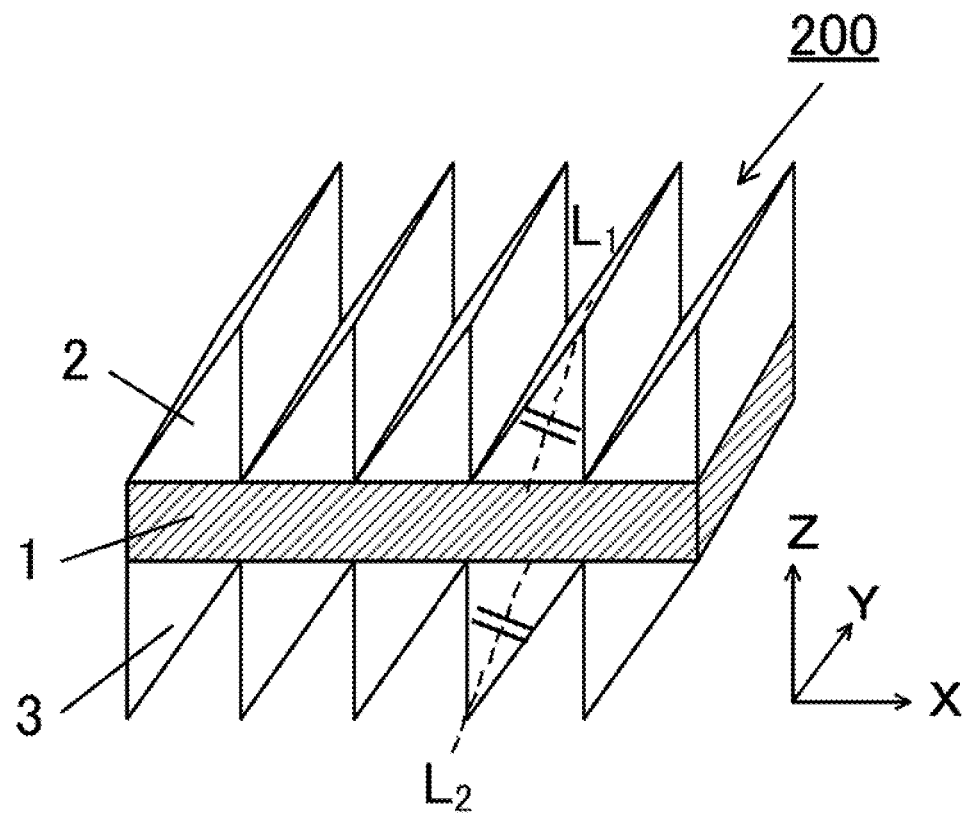
FIGS. 11A and 11B are schematic diagrams of a phase plate in Embodiment 2.
Figure 11B:
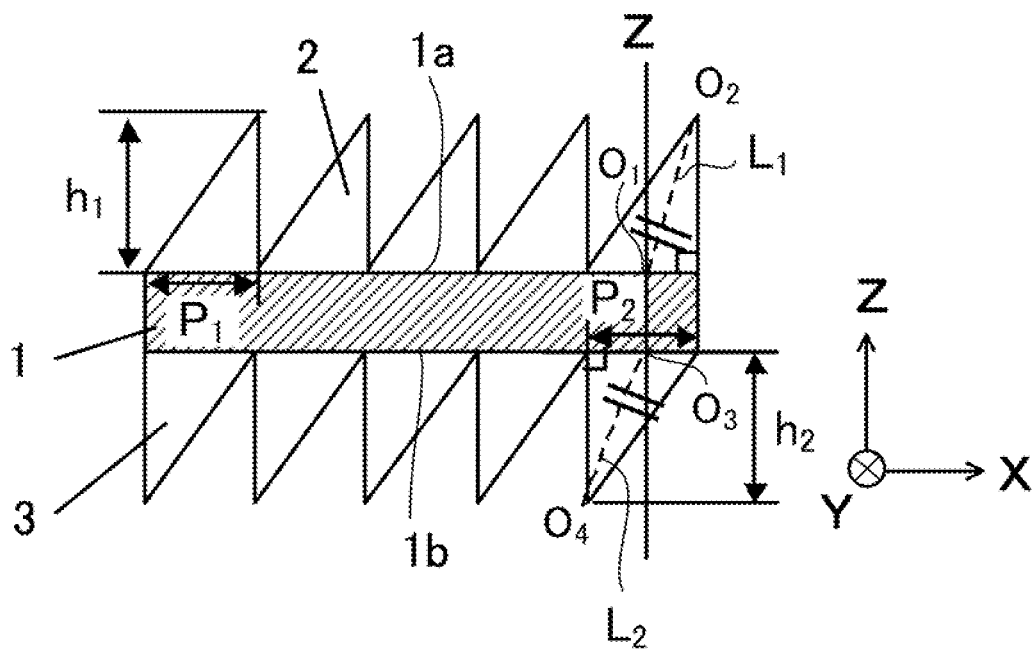

Next, a phase plate in Embodiment 2 of the present invention will be described. FIG. 11A is a schematic diagram illustrating a configuration of a phase plate 200 of the present embodiment. FIG. 11B is a diagram illustrating a cross-sectional shape in the xz plane of FIG. 11A. The phase plate 200 includes a periodic structure 2 (a first periodic structure) and a periodic structure 3 (a second periodic structure) that are formed on a first substrate surface 1a and a second substrate surface 1b (both surfaces) of the transparent substrate 1, respectively. The phase plate 200 is, similarly to Embodiment 1, configured so as to provide a phase difference from ¼ wavelength to ¾ wavelength for light having a predetermined design wavelength, and has an optical axis in a direction different from normals of the first substrate surface and the second substrate surface of the transparent substrate 1. The periodic directions of the periodic structures 2 and 3 are parallel to each other (in the x direction), and xy cross-sectional shapes of both the gratings have triangular shapes in which a substrate side is the base.

Thus, the fine periodic structure is formed on both surfaces to be able to decrease the structural height required for obtaining a predetermined phase difference. In the present embodiment, the periodic structures 2 and 3 have heights higher than or equal to 100 nm from the first substrate surface and the second substrate surface, respectively. Commonly, when a fine shape of around submicron size is formed, it is difficult to manufacture the fine shape if a ratio of the structural height with respect to the structural period is large. According to the present embodiment, since the fine periodic structure is formed on both surfaces to decrease the structural height, the phase plate itself can be easily manufactured.

In the present embodiment, in a cross section (an xz surface) of the periodic structures 2 and 3 as illustrated in FIG. 11B, a direction (a first direction) in which a center $O_1$ of a width of a unit periodic structure of the periodic structure 2 at the position closest to the first substrate surface 1a is connected with a center $O_2$ of a width at the position farthest from the first substrate surface 1a is defined as $L_1$. In addition, a direction (a second direction) in which a center $O_3$ of a width of a unit periodic structure of the periodic structure 3 at the position closest to the second substrate surface 1b is connected with a center $O_4$ of a width at the position farthest from the second substrate surface 1b is defined as $L_2$. In the present embodiment, the centers $O_2$ and $O_4$ correspond to vertexes of the triangle. In this case, the structure is formed so that the directions $L_1$ and $L_2$ are substantially parallel to each other. The term "substantially parallel" is not limited to a case where the directions $L_1$ and $L_2$ of all the unit periodic structures are exactly parallel, but it means that the effect of the present embodiment is not lost even when the angle between the directions $L_1$ and $L_2$ varies by around 5 degrees. In the present embodiment, it is preferred that the angle between the directions $L_1$ and $L_2$ be set from 0 degree to 5 degrees. Furthermore, in the present embodiment, it is preferred that an angle between the direction $L_1$ and the normal direction (the z direction) of the first substrate surface 1a be set from 5 degrees to 30 degrees. Similarly, it is preferred that an angle between the direction $L_2$ and the normal direction (the z direction) of the second substrate surface 1b be set from 5 degrees to 30 degrees. Thus, since the fine periodic grating is formed on both the substrates, the grating height is decreased compared with the shape of Embodiment 1 to be able to manufacture the phase plate more easily.

The detailed values of the phase plate in the present embodiment are indicated in Table 2.

TABLE 2

|  | PERIODIC STRUCTURE 2 | PERIODIC STRUCTURE 3 |
|---|---|---|
| PERIOD P | $P_1$ = 180 nm | $P_2$ = 180 nm |
| GRATING HEIGHT h | $h_1$ = 360 nm | $h_2$ = 360 nm |
| MATERIAL | TiO2 (n = 2.4@550 nm) | TiO2 (n = 2.4@550 nm) |
| ANGLE BETWEEN L AND z | 14.0 deg | |
| PHASE DIFFERENCE (550 nm) | 253 nm (0.46λ) | |

Figure 12:
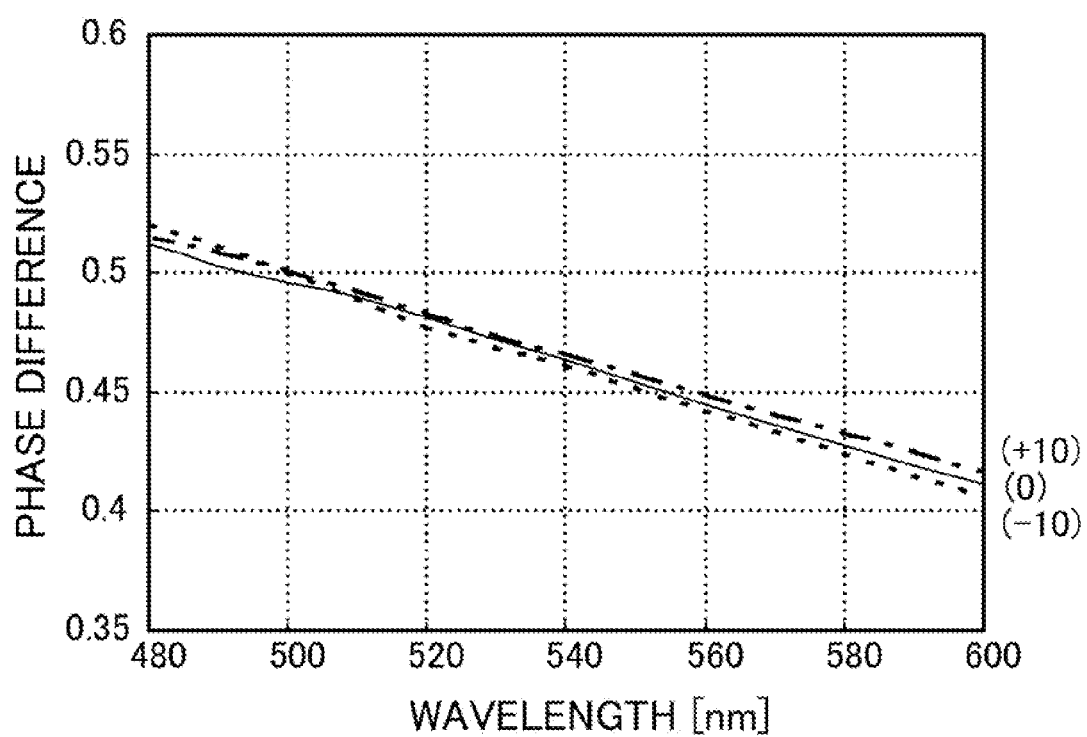
FIG. 12 is characteristics of a phase difference of the phase plate in Embodiment 2.

In the phase plate of the present embodiment, a $TiO_2$ grating (the refractive index n=2.4, and the design wavelength 550 nm) having the grating periods $P_1=P_2=180$ nm and the grating heights $h_1=h_2=360$ nm is formed on both the surfaces of the substrate. The phase plate is configured so that the grating tilt directions $L_1$ and $L_2$ are substantially parallel to each other. The cross section of the grating in the xz plane has the triangular shape as illustrated in FIG. 11B, and one of the grating side surfaces is disposed so as to be parallel to the yz plane. FIG. 12 illustrates characteristics of spectroscopic phase differences in the phase plate of the present embodiment. The differences of types of lines indicate the differences of the phase difference in a +10 degree incidence, a vertical incidence, and a −10 degree incidence, respectively. The phase plate of the present embodiment functions as a phase plate which provides a phase difference of around 0.46λ for the light having the design wavelength of 550 nm, and the phase plate in the present embodiment has characteristics equivalent to the structure in which the optical axis is inclined from the in-plane direction by around 14 degrees.

Embodiment 3

Figure 13A:
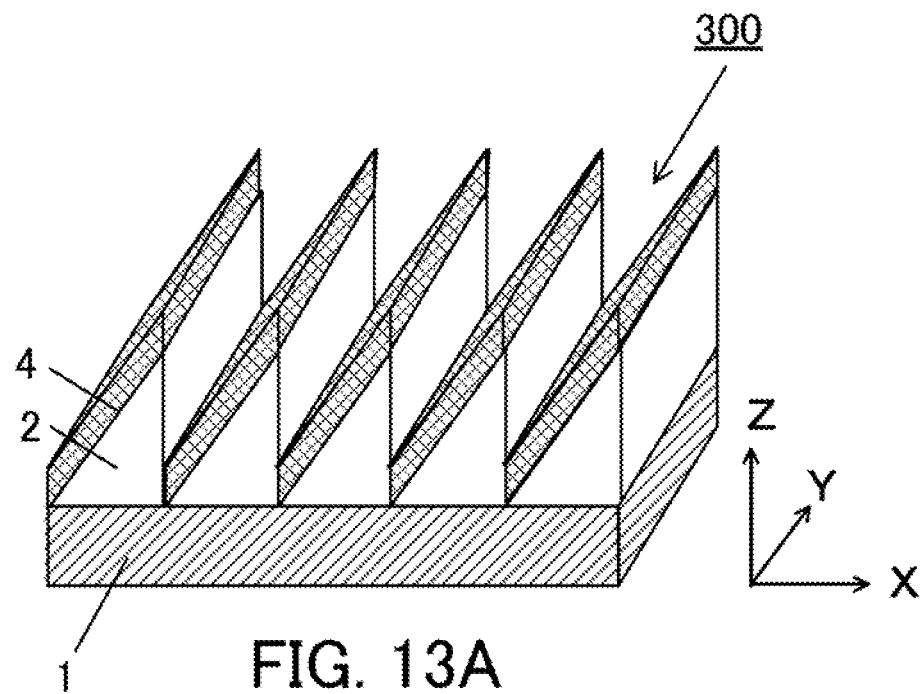
FIGS. 13A and 13B are schematic diagrams of a phase plate in Embodiment 3.
Figure 13B:
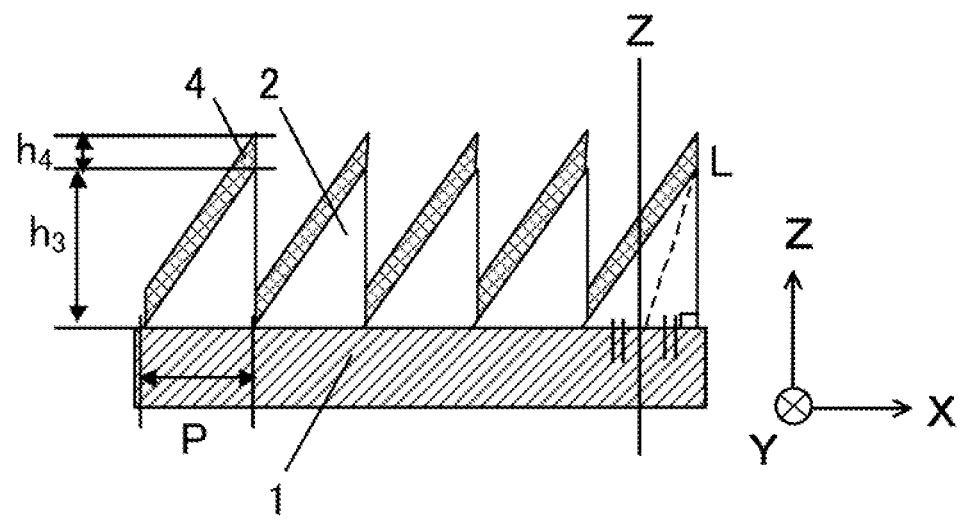

Next, a phase plate in Embodiment 3 of the present invention will be described. FIG. 13A is a schematic diagram illustrating a configuration of a phase plate 300 in the present embodiment. FIG. 13B is a diagram illustrating a cross-sectional shape in the xz plane of FIG. 13A. A fine periodic structure 2 is formed on an upper surface of the transparent substrate 1. A layer 4 that has a refractive index different from a refractive index of a material constituting the periodic structure 2 is formed on the periodic structure 2. It is preferred that a height $h_4$ of the layer 4 be set to lower than or equal to a grating height $h_3$ of the periodic structure 2. In addition, the refractive index of the layer 4 is higher than the refractive index of the periodic structure 2. Therefore, the height of whole of the periodic structure 2 is increased to be able to enlarge a phase difference of the phase plate. In the present embodiment, the refractive index of the periodic structure 2 does not have to be greater than or equal to 1.6, and a large amount of the phase difference is easily obtained when the refractive index difference with reference to the layer 4 is large.

The direction L of the refractive index anisotropy is not a direction in which a center of a width of a vertex portion of the layer 4 is connected with a center of a width of a lower surface portion of the periodic structure 2, but it can be a direction in which a center of a width of a vertex portion (a surface side) of the periodic structure 2 is connected with the center of the width of the lower surface portion (a substrate side). Due to the influence of the layer 4, an inclination angle of the refractive index anisotropy as a whole of the phase plate may be shifted from the direction L. However, the influence of the inclination of the refractive index anisotropy is small when the height $h_4$ of the layer 4 is low, and on the other hand the layer 4 itself functions as a periodic structure which is inclined with respect to the surface normal when the height $h_4$ of the layer 4 is as high as around the grating height $h_3$ of the periodic structure 2. The tilt direction of the refractive index anisotropy in this case is parallel to the direction L that is obtained by the periodic structure 2. Therefore, generally, the direction L of the refractive index anisotropy can be considered as a direction in which the center of the width of the vertex portion (the surface side) of the periodic structure 2 is connected with the center of the width of the lower surface portion (the substrate side).

The detailed design values of the phase plate in the present embodiment are indicated in Table 3.

TABLE 3

| | PERIODIC STRUCTURE 2 | LAYER 4 |
|---|---|---|
| PERIOD P | 180 nm | (180 nm) |
| GRATING HEIGHT h | $h_3$ = 280 nm | $h_4$ = 280 nm |
| MATERIAL | SiO2 (n = 1.48@550 nm) | TiO2 (n = 2.4@550 nm) |
| ANGLE BETWEEN L AND z | 17.8 deg | |
| PHASE DIFFERENCE (550 nm) | 137 nm (0.25λ) | |

Figure 14:
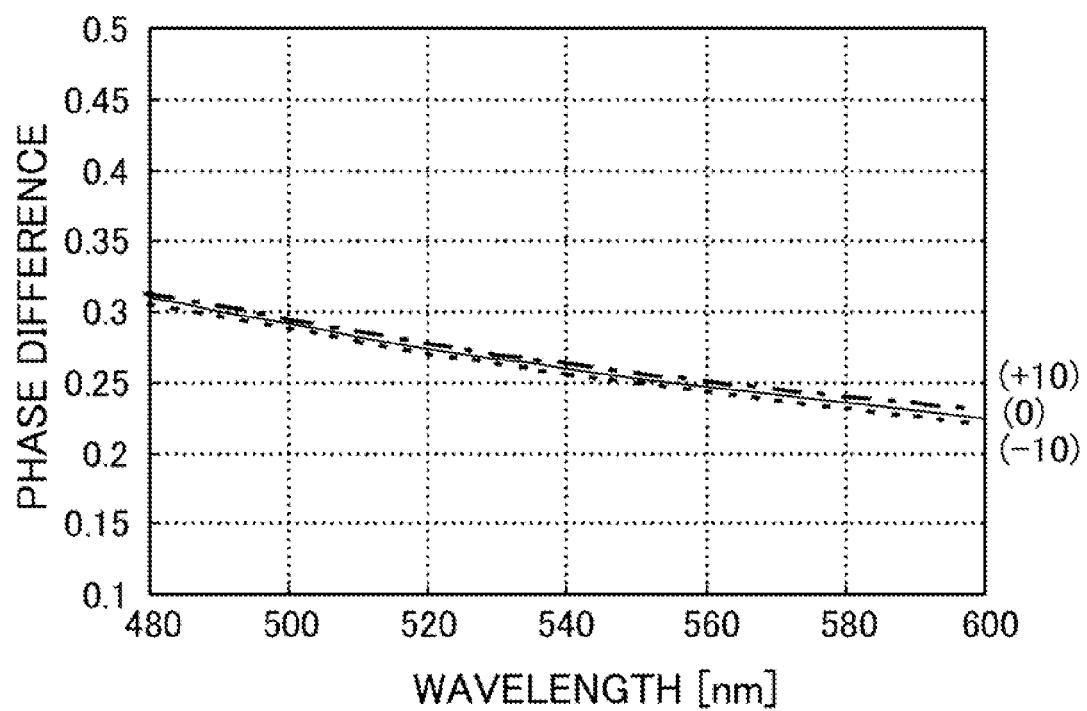
FIG. 14 is characteristics of a phase difference of the phase plate in Embodiment 3.

In the phase plate of the present embodiment, s SiO$_2$ grating (the refractive index=1.48, and the design wavelength 550 nm) having the grating period 180 nm and the grating height $h_3$=280 nm is formed on one of the surfaces of the substrate. A TiO$_2$ grating (the refractive index n=2.4, and the design wavelength 550 nm) having a thickness h4=280 nm is formed on an upper surface of the SiO$_2$ grating. The schematic diagram of the grating cross section in the xz plane indicates a triangular shape as illustrated in FIG. 13B, and one of the grating side surfaces is disposed so as to be parallel to the yz plane. FIG. 14 illustrates characteristics of spectroscopic phase differences in the phase plate of the present embodiment. The differences of types of lines indicate the differences of the phase difference in a +10 degree incidence, a vertical incidence, and a −10 degree incidence, respectively. The phase plate of the present embodiment functions as a phase plate which provides a phase difference of around 0.25λ for the wavelength 550 nm, and the phase plate has characteristics equivalent to the structure in which the optical axis is inclined from the in-plane direction by around 18 degrees.

In the present embodiment, the case in which the refractive index of the layer 4 is greater than the refractive index of the periodic structure 2 is described, but alternatively, the refractive index of the layer 4 may be smaller than the refractive index of the periodic structure 2. In the case, the layer 4 functions as an antireflection layer. The upper surface of the periodic structure is covered with the layer 4 that has the refractive index smaller than the refractive index of the periodic structure 2 to gently change the effective refractive index from the incident side to the substrate side. As a result, the reflection generated by the periodic structure 2 can be reduced, and the phase plate having a high transmittance can be obtained.

Embodiment 4

Figure 15:
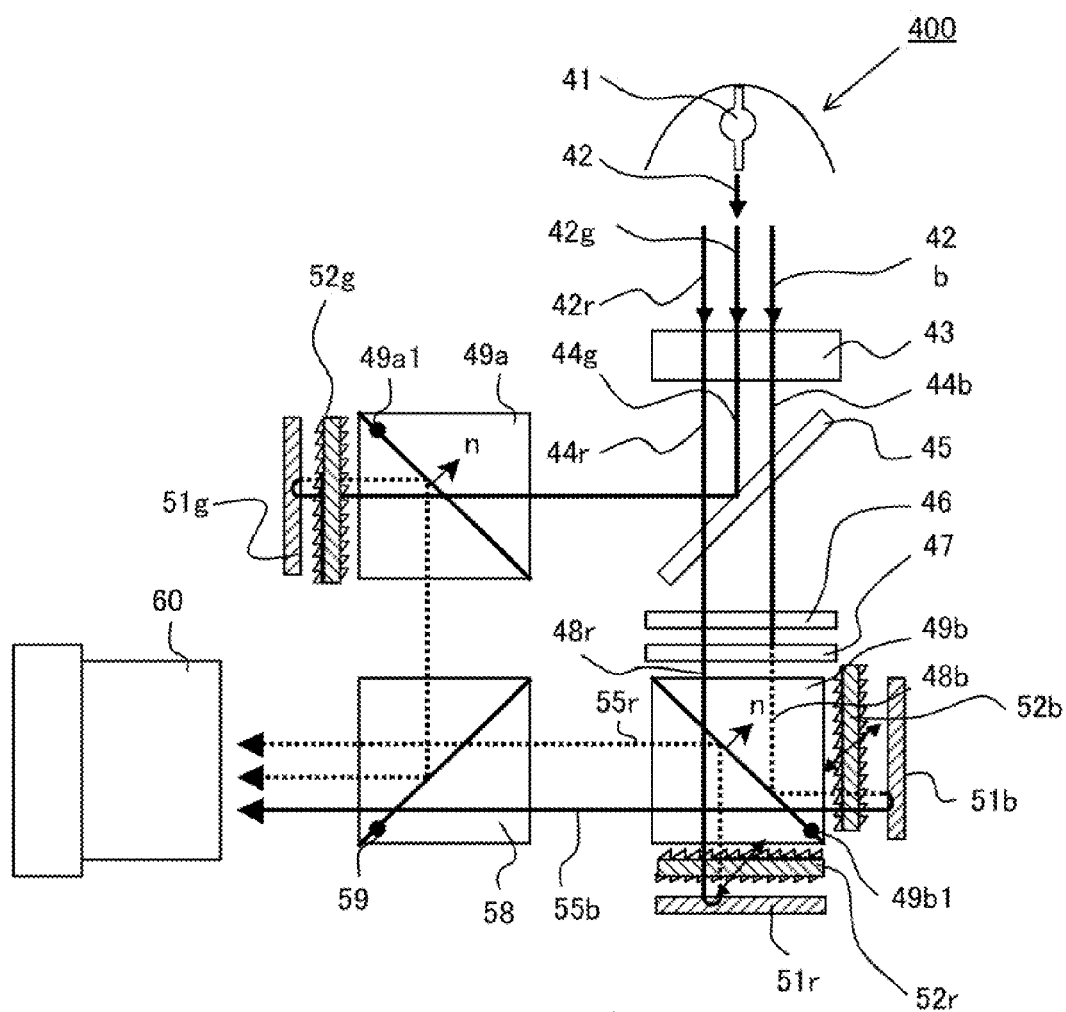
FIG. 15 is a schematic diagram of a projection image display apparatus in Embodiment 4.

Next, a projection image display apparatus that has a phase plate in Embodiment 4 of the present invention will be described. FIG. 15 is a schematic diagram illustrating a configuration of the projection image display apparatus in the present embodiment. A projection image display apparatus 400 includes a light source 41, a polarization conversion element 43, a dichroic mirror 45, a polarization plate 46, a color selective phase plate 47, a polarization beam splitter 49a for green, and a polarization beam splitter 49b for blue and red. The projection image display apparatus also includes image display elements 51g, 51b, and 51r, phase plates 52g, 52b, and 52r, a synthetic prism 58, and a projection lens optical system 60 (a projection optical system).

The projection lens optical system 60 projects image light that is emitted from the image display elements 51g, 51b, and 51r. The polarization conversion element 43, the dichroic mirror 45, the polarization plate 46, and the color selective phase plate 47 constitute an illumination optical system that illuminates the image display element 51g, 51b, and 51r using illumination light from the light source 41. The polarization beam splitter 49a introduces the illumination light from the illumination optical system into the image display element 51g, and also introduces the image light from the image display element 51g into the projection lens optical system 60. Similarly, the polarization beam splitter 49b introduces the illumination light from the illumination optical system into the image display elements 51b and 51r and introduces the image lights from the image display elements 51b and 51r into the projection lens optical system 60. In the projection image display apparatus 400, substrate surfaces (a first substrate surface and a second substrate surface) of the phase plate 52g are disposed in parallel to a light incident surface of the image display element 51g. Similarly, substrate surfaces (a first substrate surface and a second substrate surface) of the phase plates 52b and 52r are disposed in parallel to the light incident surfaces of the image display elements 51b and 51r, respectively.

Light emitted from the light source 41 is reflected on a reflector to be substantially parallel light 42 to enter the polarization conversion element 43. In FIG. 15, white parallel light 42 is separated into three primary colors of green, blue, and red, and they are illustrated as green light 42g, blue light 42b, and red light 42r. Each of the green, blue, and red lights is described so as to be spatially separated in FIG. 15 conveniently, but these three lights are not spatially separated in this stage. Hereinafter, the green light, the blue light, and the red light are abbreviated as G, B, and R, respectively.

Each color light emitted from the light source 41 transmits through the polarization conversion element 43 to be G polarized light 44g, B polarized light 44b, and R polarized light 44r whose polarization directions are uniform to enter the dichroic mirror 45. The dichroic mirror 45 has characteristics of reflecting only a G band, and the G polarized light is reflected and the R and B polarized lights transmit to perform the color separation of the G polarized light. The G polarized light enters the polarization beam splitter 49a as it is, and it transmits through the phase plate 52g to enter the image display element 51g for G. The color-separated R polarized light and B polarized light transmit through the polarization plate 46 to improve the polarization degree, and then they enter the color selective phase plate 47. The color selective phase plate 47 has characteristics of converting a polarization direction by 90 degrees only for the B polarized light, and the B polarized light enters the polarization beam splitter 49b in a state where the polarization direction of the B polarized light rotates by 90 degrees. The polarization beam splitters 49a and 49b are elements that the P polarized light transmits through and that the S polarized light is reflected on of the polarized lights entering the polarization splitting surfaces 49a1 and 49b1. The element having such a function is for example an element that is formed by laminating thin films having different refractive indexes onto the polarization splitting surfaces 49a1 and 49b1. Due to the polarization splitting surface 49b1 of the polarization beam splitter 49b, the B polarized light is reflected and the R polarized light transmits to perform the color separation, and they transmit through the phase plates 52b and 52r to enter the image display elements 51b and 51r corresponding to respective colors. The polarization directions of the lights illuminated on the image display elements 51b, 51r, and 51g are converted for each pixel in accordance with an image signal, and they are reflected to be image lights. The image lights of B and R enters the polarization beam splitter 49b again after transmitting through the phase plates 52b and 52r again. The image light of the B polarized light transmits to be the blue light 55b, and the image light of the R polarized light is reflected on the polarization splitting surface 49b1 to be the red light 55r and is emitted from the polarization beam splitter 49b to synthesize the blue light 55b and the red light 55r. The image light of the G polarized light is also reflected by the polarization splitting surface 49a1 of the polarization beam splitter 49a after transmitting through the phase plate 52g, and it enters the synthetic prism 58. Due to the dichroic film 59 in the synthetic prism 58, the image light for G is reflected and the image lights for B and R (the blue light 55b, and the red light 55r) to synthesize the G, R, and B lights to be emitted. The color-synthesized image light is projected onto a screen by the projection lens optical system 60 to be imaged.

The polarization beam splitters 49a and 49b are elements that have functions of separating the image light and the illumination light by the transmission of the P polarized light and the reflection of the S polarized light. In accordance with incident angles or incident directions for the polarization splitting surfaces 49a1 and 49b1, directions of the P polarized light and S polarized light with respect to the polarization splitting surfaces, i.e. oscillation directions of the transmitted or reflected light (a polarization axis) is changed. With respect to the ray vertically entering the image display elements 51g, 51b, and 51r, the polarization splitting surfaces 49a1 and 49b1 are inclined at a predetermined angle. Therefore, even when the polarized light enters the image display elements 51g, 51b, and 51r at the same angle, the direction of the polarization axis is different if the incident direction is different. Accordingly, the polarized lights separated by the polarization beam splitters 49a and 49b have asymmetric polarization states depending on the incident angle or direction. If there is a disturbance of the polarization state, in spite of the black display state, an undesired light leakage is generated in detecting the light by the polarization beam splitter and the contrast of the projection image is decreased.

The phase plates 52g, 52b, and 52r of the present embodiment are disposed between one of the polarization beam splitters 49a and 49b and one of the image display elements 51g, 51b, and 51r. In particular, they compensate the changes of the asymmetric phase difference depending on the incident angle, which is caused by the polarization beam splitters 49a and 49b. Since the phase plate 52g, 52b, and 52r are inclined in directions Lg, Lb, Lr in which the refractive index anisotropies are determined based on the periodic structure, the polarized light transmitting through the phase plate indicates an asymmetric phase change in accordance with the incident angle and direction. The shift of the asymmetric polarization axis that is generated in the ray obliquely incident on the polarization beam splitter is compensated by the asymmetric phase change that is generated in transmitting through the phase plates 52g, 52b, and 52r, and the light leakage that is generated in detecting the light by the polarization beam splitter can be effectively suppressed. In this case, in order to obtain sufficient phase compensation effect, it is preferred that the phase plate have a phase difference between 0.25λ and 0.75λ with respect to a central wavelength of each optical path, and more preferably the phase plate has the phase difference around 0.5λ. As illustrated in FIG. 15, it is preferred that the phase plate be disposed so that the directions Lg, Lb, and Lr of the periodic structures of the phase plates 52g, 52b, and 52r, the surface normal direction (the first direction) of the phase plate, and the normal directions n of the polarization splitting surfaces 49a1 and 49b1 are in the same plane.

The detailed design values of the phase plates 52g, 52b, and 52r of the projection image display apparatus in the present embodiment are indicated in Table 4.

TABLE 4

| | PERIODIC STRUCTURE 2 | LAYER 4 |
| --- | --- | --- |
| | (FOR B OPTICAL PATH) | |
| FOR B | | |
| PERIOD P | 100 nm | (100 nm) |
| GRATING HEIGHT h | 193 nm | 193 nm |

TABLE 4-continued

| | PERIODIC STRUCTURE 2 | LAYER 4 |
|---|---|---|
| MATERIAL | SiO2 (n = 1.48@450 nm) | TiO2 (n = 2.52@450 nm) |
| ANGLE BETWEEN L AND z | 14.7 deg | |
| PHASE DIFFERENCE (450 nm) | 225 nm (0.50λ) | |
| | (FOR G OPTICAL PATH) | |
| FOR G | | |
| PERIOD P | 180 nm | (180 nm) |
| GRATING HEIGHT h | 280 nm | 280 nm |
| MATERIAL | SiO2 (n = 1.48@550 nm) | TiO2 (n = 2.40@550 nm) |
| ANGLE BETWEEN L AND z | 17.8 deg | |
| PHASE DIFFERENCE (550 nm) | 275 nm (0.50λ) | |
| | (FOR R OPTICAL PATH) | |
| FOR R | | |
| PERIOD P | 230 nm | (230 nm) |
| GRATING HEIGHT h | 340 nm | 340 nm |
| MATERIAL | SiO2 (n = 1.47@630 nm) | TiO2 (n = 2.32@630 nm) |
| ANGLE BETWEEN L AND z | 18.7 deg | |
| PHASE DIFFERENCE (630 nm) | 315 nm (0.50λ) | |

Fine Periodic Structure is Formed on Both Surfaces

Figure 16A:
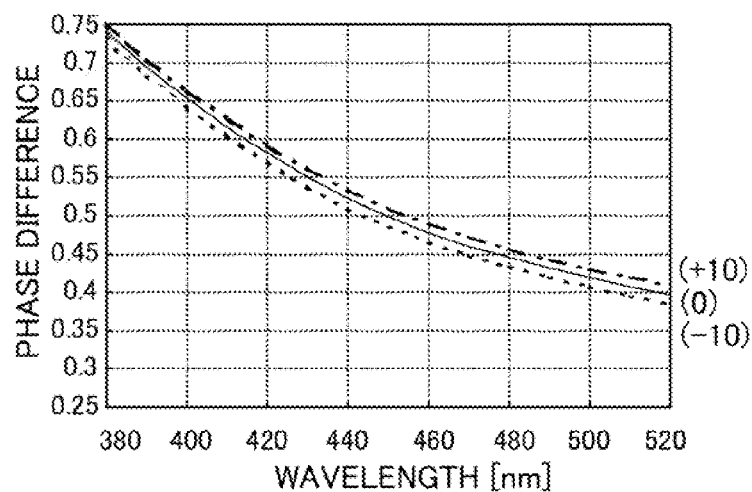
FIGS. 16A to 16C are characteristics of phase differences of phase plates in Embodiment 4 for B, G, and R optical paths, respectively.
Figure 16B:
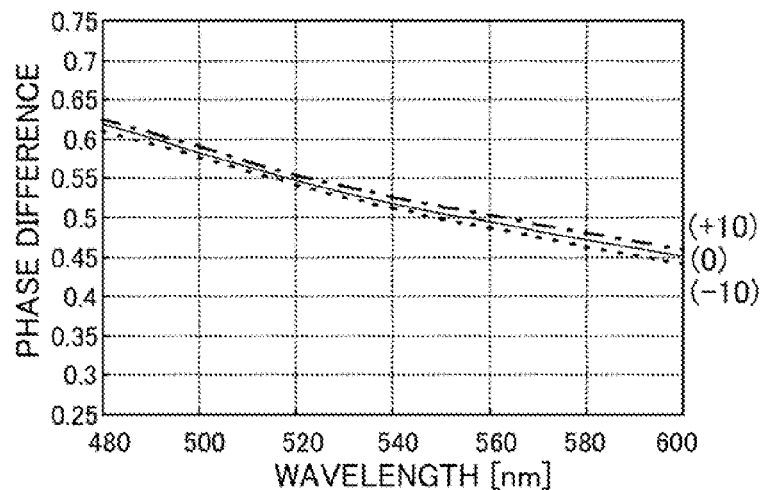
Figure 16C:
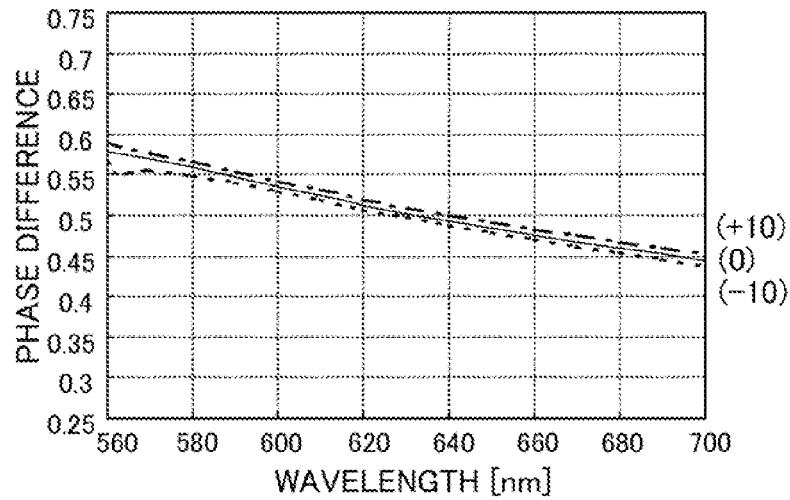

The phase plate of the present embodiment has a shape in which the periodic structure 2 having a cross-sectional shape of a triangle is formed on both surfaces of the substrate and the layer 4 having a high refractive index is formed on an upper surface of the periodic structure 2. As the phase plate 200 of Embodiment 2, the phase plate is disposed so that the grating directions L1 and L2 of each surface are substantially parallel to each other. FIGS. 16A to 16C illustrate characteristics of a spectroscopic phase differences in the phase plates 52b, 52g, and 52r in the present embodiment, respectively. The differences of types of lines indicate the differences of the phase difference in a +10 degree incidence, a vertical incidence, and a −10 degree incidence, respectively. The phase plate 52b of the present embodiment functions as a 0.50λ phase plate for the wavelength 450 nm, the phase plate 52g functions as a 0.50λ phase plate for the wavelength 550 nm, and the phase plate 52r functions as a 0.50λ phase plate for the wavelength 630 nm. The phase plate has characteristics equivalent to the structure in which each optical axis is inclined from the in-plane direction by around 15 degrees to 19 degrees.

In addition to the phase plate of the present embodiment, a phase plate which is used for compensating the incident angle characteristics with respect to the image display element using the liquid crystal, or a phase plate which is used for compensating a liquid crystal pre-tilt angle may also be added. In this case, it is preferred that the phase plate used for compensating the image display element be added between the image display element and the phase plate of the present embodiment. In such a configuration, the light leakage is further suppressed to be able to improve the contrast.

Since the phase plates 52g, 52b, and 52r are phase plates made of an inorganic material, the durability for the heat or the ultraviolet can be improved and a stable image can be displayed for a long time even when the light intensity of the light source is increased to achieve high brightness. Thus, the phase plate of the present embodiment contributes to combining the high brightness and the high contrast of the projection image display apparatus by a simple manufacturing method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-206369, filed on Sep. 15, 2010, which is hereby incorporated by reference herein in its entirety.

What is claimed is:

1. A phase plate comprising:
a transparent substrate; and
a periodic structure that is formed on a substrate surface of the transparent substrate and that has a period of at most a visible light wavelength,
wherein the phase plate is configured so as to provide light having a predetermined design wavelength of the visible light wavelength that vertically enters the substrate surface with a phase difference from ¼ wavelength to ¾ wavelength,
wherein the periodic structure is configured so as to reduce a volume occupation rate with increasing distance from the transparent substrate in a plane parallel to the substrate surface of the transparent substrate, the periodic structure having a height of at least 200 nm from the substrate surface, and
wherein, in a cross section that is parallel to both a period direction of the periodic structure and a normal direction of the substrate surface, an angle between a first direction in which a center of a width of a unit periodic structure at a position closest to the substrate surface is connected with a center of a width of a unit periodic structure at a position farthest from the substrate surface and a normal direction of the substrate surface is from 5 degrees to 30 degrees.

2. The phase plate according to claim 1,
wherein the period of the periodic structure is from 50 nm to 350 nm.

3. The phase plate according to claim 1,
wherein a layer that has a refractive index different from a refractive index of a material constituting the periodic structure and that has a height of at most a height of the periodic structure on the periodic structure.

4. The phase plate according to claim 1,
wherein, in the cross section of the periodic structure, both two base angles of the unit periodic structure are at most 90 degrees and one of the two base angles is at least 85 degrees.

5. The phase plate according to claim 1,
wherein the angle between the first direction and the normal direction of the substrate surface is from 5 degrees to 25 degrees.

6. A phase plate comprising:
a transparent substrate; and
a first periodic structure and a second periodic structure having a period at most a visible light wavelength and formed on a first substrate surface and a second substrate surface of the transparent substrate, respectively,
wherein the phase plate is configured so as to provide light having a predetermined design wavelength of the visible light wavelength that vertically enters the first substrate surface with a phase difference from ¼ wavelength to ¾ wavelength, wherein the first periodic structure is configured so as to reduce a volume occupation rate in accordance with increasing distance from the transparent substrate in a plane parallel to the first substrate surface of the transparent substrate, the first periodic structure having a height of at least 100 nm, wherein the second periodic structure is configured so as to reduce a volume occupation rate in accordance with increasing distance from the transparent substrate in a plane parallel to the second substrate surface of the transparent substrate, the second periodic structure having a height of at least 100 nm, wherein period directions of the first periodic structure and the second periodic structure are parallel to each other, wherein, in a cross section that is a plane parallel to both the period directions of the first periodic structure and the second periodic structure and normal directions of the first substrate surface and the second substrate surface, an angle between a first direction in which a center of a width of a unit periodic structure at a position closest to the first substrate surface of the first periodic structure is connected with a center of a width of a unit periodic structure at a position farthest from the first substrate surface and a second direction in which a center of a width of a unit periodic structure at a position closest to the second substrate surface of the second periodic structure is connected with a center of a width of a unit periodic structure at a position farthest from the second substrate surface is from 0 degree to 5 degrees, wherein an angle between the first direction and the normal direction of the first substrate surface is from 5 degrees to 30 degrees, and wherein an angle between the second direction and the normal direction of the second substrate surface is from 5 degrees to 30 degrees.

7. A projection image display apparatus comprising:
an image display element;
an illumination optical system configured to illuminate the image display element using illumination light from a light source;
a projection optical system configured to project image light that is emitted from the image display element; and
a phase plate according to claim 1.

8. The projection image display apparatus according to claim 7, further comprising a polarization beam splitter configured to introduce the illumination light from the illumination optical system to the image display element and introduce the image light from the image display element to the projection optical system,
wherein the phase plate is disposed between the image display element and the polarization beam splitter.

9. The projection image display apparatus according to claim 8,
wherein a normal direction of a polarization splitting surface of the polarization beam splitter and the first direction are in the same plane.

10. The projection image display apparatus according to claim 7,
wherein one of the substrate surface, and the first and second substrate surfaces is parallel to a light incident surface of the image display element.

11. A projection image display apparatus comprising:
an image display element;
an illumination optical system configured to illuminate the image display element using illumination light from a light source;
a projection optical system configured to project image light that is emitted from the image display element; and
a phase plate according to claim 6.

* * * * *